US011220725B2

(12) United States Patent
Jalbout (10) Patent No.: US 11,220,725 B2
(45) Date of Patent: Jan. 11, 2022

(54) METHOD OF COPPER CONCENTRATE SULFATION AND LEACHING

(71) Applicant: METOXS PTE. LTD., Singapore (SG)

(72) Inventor: Abraham Fouad Jalbout, Tucson, AZ (US)

(73) Assignee: CLEAN RESOURCES PTE. LTD., Singapore (SG)

( * ) Notice: Subject to any disclaimer, the term of this patent is extended or adjusted under 35 U.S.C. 154(b) by 166 days.

(21) Appl. No.: 16/060,900

(22) PCT Filed: Dec. 9, 2016

(86) PCT No.: PCT/IB2016/057496
§ 371 (c)(1),
(2) Date: Jun. 8, 2018

(87) PCT Pub. No.: WO2017/098466
PCT Pub. Date: Jun. 15, 2017

(65) Prior Publication Data
US 2018/0363099 A1    Dec. 20, 2018

(51) Int. Cl.
C25C 1/00        (2006.01)
C22B 15/00       (2006.01)
C25C 1/12        (2006.01)

(52) U.S. Cl.
CPC ........ C22B 15/0071 (2013.01); C22B 15/001 (2013.01); C22B 15/0017 (2013.01); C25C 1/12 (2013.01); *Y02P 10/20* (2015.11)

(58) Field of Classification Search
CPC .............. C25C 1/12; C25C 1/00; C25B 1/00
USPC ........................................................ 205/583
See application file for complete search history.

(56) References Cited

U.S. PATENT DOCUMENTS

| 1,514,153 | A | * | 11/1924 | Greenawalt ......... C22B 15/0084 205/347 |
| 3,839,013 | A | | 10/1974 | Turkdogan et al. |
| 4,003,740 | A | | 1/1977 | Huggins et al. |
| 5,895,633 | A | | 4/1999 | King |
| 8,920,773 | B2 | | 12/2014 | Robertson et al. |

(Continued)

FOREIGN PATENT DOCUMENTS

| CA | 1 050 767 A | 3/1979 |
| CN | 1358871 A | 7/2002 |
| CN | 103 643 037 A | 3/2014 |

(Continued)

OTHER PUBLICATIONS

Supplemental European Search Report of European Application No. 16 87 2528.

(Continued)

*Primary Examiner* — Zulmariam Mendez
(74) *Attorney, Agent, or Firm* — Blank Rome LLP (57) ABSTRACT

The method of recovering copper from sulfide ores with copper and iron, comprises the steps of reacting, in a reaction vessel, a copper-containing sulfide ore with sulfur dioxide gas to form elemental sulfur, an iron oxide and a copper sulfide, separating the solids comprising the iron oxide and copper sulfate from a liquid phase of the reaction mixture, leaching the dried solids with an aqueous solution comprising water or dilute sulfuric acid and solubilizing the copper sulfate, and recovering copper from the solubilized copper sulfate.

14 Claims, 5 Drawing Sheets

(56) References Cited

U.S. PATENT DOCUMENTS

2013/0156661 A1* 6/2013 Robertson ................ C22B 1/02
                                                                                       423/32

FOREIGN PATENT DOCUMENTS

| CN | 104785357 A | 7/2015 |
| EP | 1303642 B1 | 2/2008 |
| JP | 5370683 B2 | 12/2013 |

OTHER PUBLICATIONS

Chinese Search Report of Chinese Application No. 201680072320.5.

Design Handbook for Heavy Non-ferrous Metal Smelting: Copper and Nickel, Beijing Non-ferrous Metallurgical Design and Research Institute Beijing: Metallurgical Industry Press, p. 342.

Vol. 1 of Handbook for Ore Dressing Engineers: General Mineral Processing, Chuanyao Sun, Beijing: Metallurgical Industry Press, pp. 589, 594.

* cited by examiner

METHOD OF COPPER CONCENTRATE SULFATION AND LEACHING

CROSS-REFERENCE TO RELATED APPLICATIONS

This application is a national phase application of PCT/IB2016/057496, filed Dec. 9, 2016, which claims priority to Singapore Application No. 10201510144U, filed Dec. 10, 2015. The entire contents of those applications are incorporated herein by reference.

FIELD OF TECHNOLOGY

The present application relates one or more hydrometallurgical methods of treating metal-containing sulphide ores and concentrates. Particularly, the application also relates to one or more methods of copper concentrate leaching and sulfation. The one or more methods are alternatively known as process or processes.

BACKGROUND

The treatment of copper concentrate by smelting converting and electro-refining has dominated the copper industry since 1800s. Research and development in searching for hydrometallurgical alternatives to traditional pyrometallurgy processes has intensified in recent years.

The primary sulfide minerals of copper have been difficult to leach for direct copper extraction. In particular, chalcopyrite ($CuFeS_2$) has been observed to undergo a type of passivation under a variety of oxidative leaching conditions. Chalcopyrite is one of the most abundant copper-bearing minerals, accounting for approximately 70% of the world's known copper reserves. Most of the currently proposed leaching processes are based on sulfuric acid with ferric ions and/or dissolved oxygen as oxidants.

Chalcopyrite is not only the most abundant of the copper sulfides, but also the most stable mineral and refractory to hydrometallurgical processing. In current practice, the recovery of copper from the sulfides ores of chalcopyrite involves subjecting the ores to a froth flotation operation that produces a concentrate of the valuable metal sulfides, which is then commonly smelted and electro-refined to produce copper metal.

Sulfide (i.e. Sulphide) ores are either treated as such, concentrated or leached to recover the valuable metals. Roasting, sintering, and smelting of these ores or concentrates of these ores are known treatment methods or processes. In known chalcopyrite leaching or Sulfation process, the passivation of the process is typically a problem in the dissolution of copper contained in the sulfide ores. More efficient and cost effective treatment methods are always desired.

BRIEF SUMMARY

The present application aims to provide one or more new and useful methods. The application also intends to provide new and useful methods for processing copper concentrate. Essential features of the application are provided by one or more independent claims, whilst advantageous features of the application are presented by their dependent claims respectively.

Copper concentrate leaching process normally refers to the flow of components contained in a solid material into another phase, which is typically a liquid phase. The present application provides a Sulfation process or a dissolution-Sulfation process, which is related to the leaching process. The Sulfation process of present application can achieve extractions of above 90% copper or higher from copper concentrates. The method also requires very low residence times, which may range between 60 and 120 minutes.

The method utilizes a high concentration of sulfuric acid (e.g. over 90% concentration level) and maintains the sulfuric acid at this high concentration level in a glass-lined reactor for obtaining high copper extraction with short residence times. The present method requires the injection of oxygen gas in order to regenerate the acid by reaction with sulfur dioxide ($SO_2$) and water ($H_2O$) generated during the Sulfation process. Accordingly, the method maintains high concentrations of sulfuric acid in the reactor.

The method introduces vigorous agitation and appropriate agitation (e.g. using a Rushton impeller) in order to avoid passivation by interference of sulphates/sulfates (copper and iron based), which may be formed during the Sulfation process. Accordingly, oxygen gas is more efficiently used in the regeneration of sulfuric acid with high permanence and short residence time in the reactor gas. The method can further increase the efficiency of oxygen gas by using a large reactor having a suitable height:diameter (H:D) ratio (e.g., greater than 2) for increased interaction of the gaseous oxygen with the other reactants. The method requires lower temperature of about 130 degree Celsius (° C.) for keeping the elemental sulfur formed in the solution (MP 120° C.), which allows the solution to oxidize firstly to $SO_2$ and later to form sulfuric acid. The method can be carried out in one or more reactors at atmospheric pressure, which is safe, cheap and simple.

The concentrates used in this method do not require regrinding as the concentrates are obtained directly from a flotation process, which only requires drying. To ensure that all chalcopyrite has reacted, the method proposes a flotation process for recycling the chalcopyrite. In subsequent tests, reflux of the method is minimized by increasing efficiency of the reactors. The method does not require addition of certain reagents as catalysts (e.g. Ag) or oxidants (e.g. ferric sulfate $Fe_2(SO_4)_3$ or halogens (e.g. chlorine, bromine)).

BRIEF SUMMARY OF THE DRAWINGS

The accompanying figures illustrate embodiments and serve to explain principles of the disclosed embodiments. It is to be understood, however, that these figures are presented for purposes of illustration only, and not for defining limits of the present invention.

DETAILED DESCRIPTION

Exemplary, non-limiting embodiments of the present application will now be described with references to the above-mentioned figures. Particularly, embodiments of the application comprise parts or method steps that are similar or identical to each other. These parts or method steps are thus denoted with similar or identical names or reference numerals. Description of these relevant parts of method steps is hereby incorporated by reference, wherever relevant or appropriate.

As used herein, the terms "leaching" and "leaching process" refers to a process wherein substances are extracted from a solid by dissolving the solid in a liquid or solution.

As used herein, the terms "flotation" or "flotation process" refers to a process for concentrating metal-bearing minerals in an ore. Generally, in a flotation process, crude ore is ground to a fine powder and mixed with water, frothing reagents, and collecting reagents. When air is blown through the mixture, mineral particles cling to bubbles formed by the air blown through the mixture, which rise to form a froth on the surface of the mixture. The waste material (gangue) settles to the bottom. The froth is skimmed off, and the water and chemicals are distilled or otherwise removed, leaving a clean concentrate.

As used herein, the term "tailings" refers to material remaining after the removal of one or more desired materials. "Tailings" may also be defined as the waste material (gangue) formed during a flotation process or leaching process.

As used herein, the terms "electro-winning" or "electrowinning process" refers to the electrodeposition of metals from their ores that have been put in solution via a leaching process.

As used herein, the "pulp" refers to a freely-floating mixture comprising crushed and/or powdered ore and water.

As used herein, the term "pulp density" refers to the percentage of solids, or the ration of solids to liquids, contained within a pulp sample. For example, a pulp sample having a pulp density of 50 w/w % would mean that the pulp sample contains 50 weight percent solids and 50 weight percent liquids.

The hydrometallurgical method of treating metal-containing sulphide ores and concentrates is known as a global process, which comprises some individual processes. Particularly, the Sulfation process is most important because the Sulfation process provides the elements that receive kinetic strength, and makes the elements different to other processes or their variants. The proposed Sulfation process and its operating conditions associated with the dissolution process substitute a leaching process.

During the Sulfation process, sulfuric acid and chalcopyrite vigorously react resulting firstly to the following anaerobic reaction:

$$CuFeS_2 + 4H_2SO_4 \rightarrow CuSO_4 + FeSO_4 + 4H_2O + 2S + 2SO_2 \text{ (g)} \quad (1)$$

Because the medium is completely acidic, sulfates formed (e.g. $CuSO_4$ and $FeSO_4$) are almost completely insoluble. Subsequently, due to the simultaneous and adequate injection of oxygen gas ($O_2$), water ($H_2O$) and sulfur dioxide ($SO_2$), the medium reacts with the oxygen gas, water and sulfur dioxide to regenerate about half of the sulfuric acid fed according to the following reaction:

$$2H_2O + 2SO_2(g) + O_2(g) \rightarrow 2H_2SO_4 \quad (2)$$

Thus, combining reactions (1) and (2) results in the overall reaction (3) as follows:

$$CuFeS_2 + 2H_2SO_4 + O_2(g) \rightarrow CuSO_4 + FeSO_4 + 2S + 2H_2O \quad (3)$$

The water generated can evaporate and leave the acid free of, or substantially free of, moisture. In preliminary tests, it has been observed that some sulfur also tends to oxidize and form sulfuric acid according to reaction (4), making the overall reaction more self-sufficient with respect to that reagent.

$$S + 2H_2O + 3O_2(g) \rightarrow 2H_2SO_4 \quad (4)$$

After the Sulfation process, upon solid/liquid (S/L) separation, this mixture of sulphates and leaching residue is subjected to water washing. During the water washing, sulphates dissolve and a residue leach based chalcopyrite ($CuFeS_2$) remains (unreacted), which can also include sulfur (S), pyrite ($FeS_2$), silica ($SiO_2$) and some precious metals (such as, for example, Au and Ag).

In a solvent extraction and electro-winning (SX-EW) process, after the dissolution process of sulphates, the liquid stream obtained from the filtration of the pulp, which contains a minimal amount of acidity and a high concentration of copper and iron is processed in a system of solvent extraction and electro-winning for copper recovery. Pure copper is thus obtained electrolytically. In this process, remaining iron in the solution is removed via precipitation for provision or sale. Washed solid obtained after sulfate filtration is subjected to a chalcopyrite flotation process to recover any small fraction of unreacted chalcopyrite. The recovered chalcopyrite is recycled and reintroduced into the Sulfation process. Tailings obtained in this first flotation are subjected to another floatation process to separate pyrite ($FeS_2$) and remaining elemental sulfur in order to serve as a possible acid production. The pyrite in final tailings are removed for preventing acid drainage formation.

Following this, further experiments have been performed by achieving the leaching efficiencies of about 85% in copper recovery. Additional copper may be recovered from unreacted chalcopyrite by a flotation process. Moreover, the method requires residence times about 30 minutes to 2 hours, which is very low for this type of process in view of the problem of passivation posed in most cases. The S/L ratio managed to simulate industrial operation should be equal to or greater than 20%. The Sulfation methods of the present disclosure can be conducted a temperature ranging from about 100 to about 200° C., alternatively about 110 to about 180° C., alternatively about 120 to about 160° C., and alternatively about 120 to about 140° C., whilst residence times of the method is less than 2 hours. Copper recovery efficiencies of 90% or higher can possibly be achieved by the method.

Table 1 provides contents of various elements in copper concentrate and copper concentrate residue after using the method described above.

| Elements | Copper Concentrate | Copper Concentrate Residue |
|---|---|---|
| % As | 0.179 | 0.091 |
| % Bi | 0.018 | 0.001 |
| % Sb | 0.045 | 0 |
| % Fe | 27.66 | 25.89 |
| % Cu | 27.98 | 0.65 |
| % S | 35.80 | 58.61 |
| % $SiO_2$ | 3.26 | 4.2 |

Figure 1:
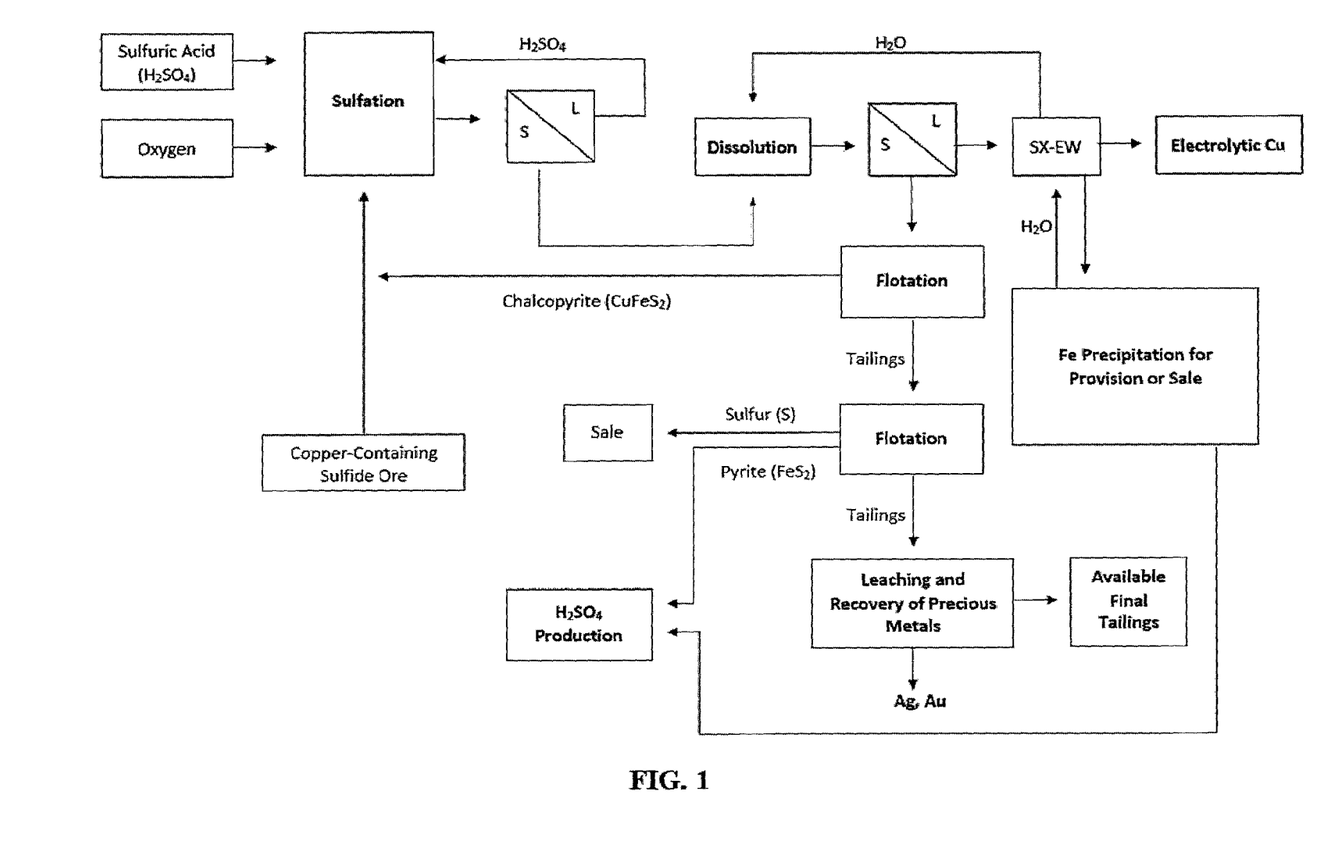
FIG. 1 is a schematic illustration of an exemplary method for the processing of copper-containing sulphide ores and isolation of individual elements of said ores in accordance with various embodiments of the present disclosure.

FIG. 1 is a schematic illustration of an exemplary method for the processing of copper-containing sulphide ores and isolation of individual elements of said ores in accordance with various embodiments of the present disclosure. The exemplary method of FIG. 1 can be considered in view of the description above. While FIG. 1 illustrates a certain number of steps or processes, one of ordinary skill in the art can readily appreciate that one or more additional steps or processes can be included in, or excluded from, the exemplary method without imparting from the subject matter of the present disclosure.

Figure 2:
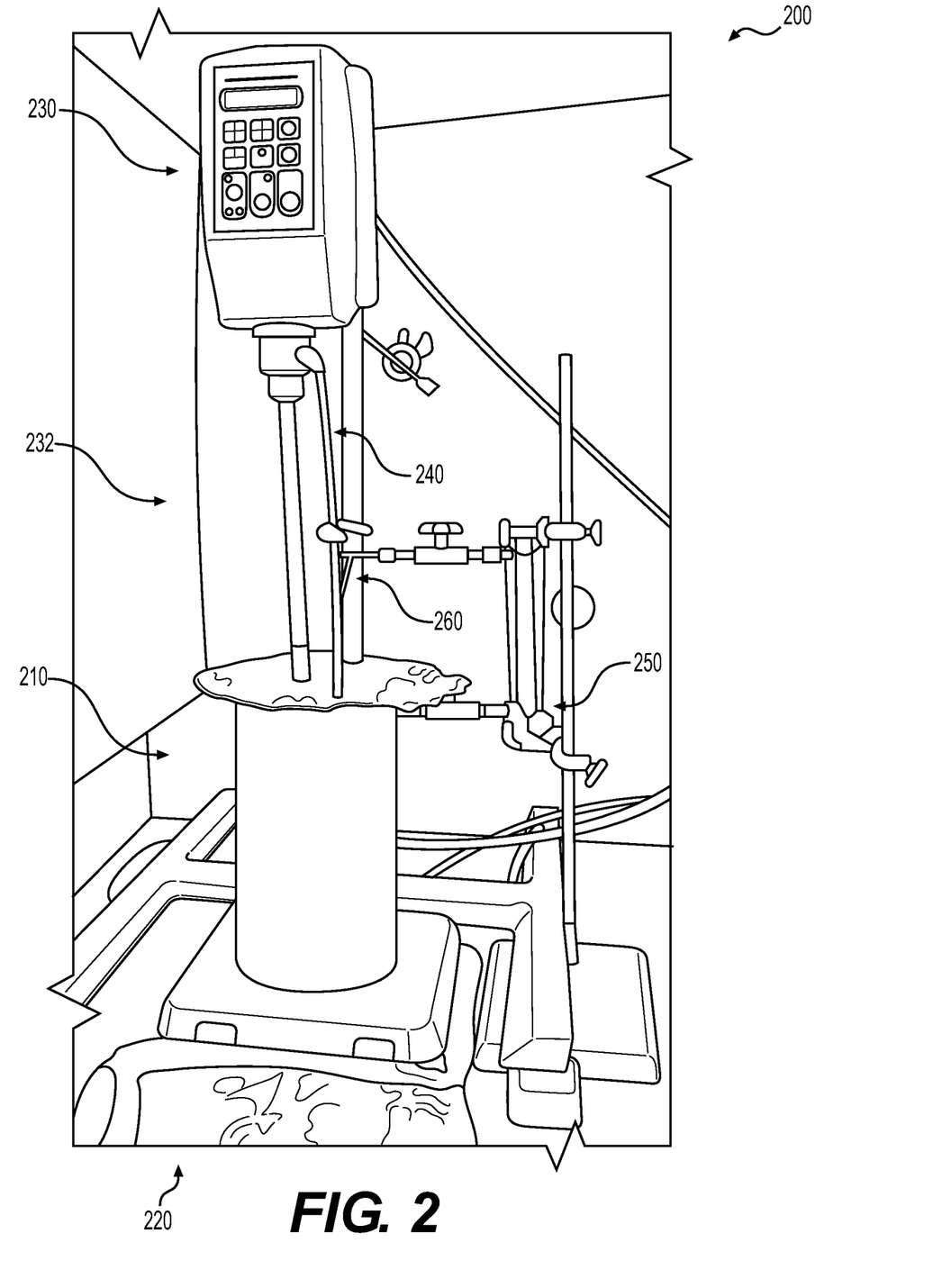
FIG. 2 is a schematic representation of an exemplary laboratory bench-top setup for the processing of copper-containing sulphide ores and isolation of individual elements of said ores in accordance with various embodiments of the present disclosure.

FIG. 2 is a schematic representation of an exemplary laboratory bench-top setup for the processing of copper-containing sulphide ores and isolation of individual elements of said ores in accordance with various embodiments of the present disclosure. The bench-top setup 200 includes a reaction vessel 210, a heating element 220 such as, for example, a hot plate, a stirring element 230 which includes an extension 232 having an impeller (not shown) on a bottom portion thereof and located in the reaction vessel 210. The bench-top setup 200 further includes a temperature measuring element 240 such as, for example, a thermometer or thermocouple, a reactant gas (for example, $O_2$) source (not shown) coupled with a flow meter 250. The flow meter is coupled with a gas diffuser 260 which diffuses the reactant gas into the reaction vessel 210.

While FIG. 2 illustrates a bench-top setup, one of ordinary skill in the art of metallurgy and ore refining, in view of FIGS. 1-2, can readily appreciate that setups or smaller or larger scale can be made without imparting from the subject matter of the present disclosure.

Copper can be obtained from sulfide ores, which can also have iron as a component thereof, using a method which comprises the following steps. First, a copper-containing sulfide ore can be reacted with reacted sulfur dioxide gas at a temperature of at least about 100° C., alternatively at least about 110° C., alternatively at least about 120° C., and alternatively at least about 130° C., to form elemental sulfur, an iron oxide (for example, magnetite, $Fe_3O_4$) and a copper sulfide. The elemental sulfur can then be condensed and removed from the reaction mixture. After removal of the elemental sulfur, the residual solids (such as the iron oxide and copper sulfide), can be reacted with concentrated sulfuric acid at a temperature of about 180° C. to 500° C. to form copper sulfate and sulfur dioxide gas. The sulfur dioxide can subsequently be recycled and reused. The solids comprising the iron oxide and copper sulfate can then be separated from a liquid phase or the reaction. After separation the solids can be dried by, for example, roasting the solids at a temperature ranging from about 400° C. to about 900° C. After drying, the solids can be subjected to an aqueous solution comprising water or dilute sulfuric acid, thereby leaching or solubilizing the copper sulfate. The remaining solids comprising the iron oxide and gangue (that is, the remaining solid material from the ore) can be separated from the remaining liquid phase of the reaction. Finally, the copper can be isolated from the solubilized copper sulfate. The copper can be isolated from the solubilized copper sulfate by, for example, a solvent extraction and electro-winning (SX-EW) process.

Statements of the Disclosure include:

Statement 1: A method of recovering copper from sulfide ores with copper and iron, the method comprising reacting, in a reaction vessel, a copper-containing sulfide ore with sulfur dioxide gas to form elemental sulfur, an iron oxide and a copper sulfide; condensing and removing the elemental sulfur from the reaction mixture; reacting the residual solids with concentrated sulfuric acid to form copper sulfate and sulfur dioxide gas; recycling the sulfur dioxide gas; separating the solids comprising the iron oxide and copper sulfate from a liquid phase of the reaction mixture; drying the separated solids; leaching the dried solids with an aqueous solution comprising water or dilute sulfuric acid and solubilizing the copper sulfate; separating the solids comprising the iron oxide and gangue from a liquid phase of the reaction mixture; and recovering copper from the solubilized copper sulfate.

Statement 2: A method according to Statement 1, wherein reacting the copper-containing sulfide ore with sulfur dioxide gas takes place at a temperature of at least about 130° C.

Statement 3: A method according to Statement 1 or Statement 2, wherein reacting the residual solids with concentrated sulfuric acid takes place at a temperature of about 180° C. to 500° C.

Statement 4: A method according to any one of Statements 1-3, wherein the recycled sulfur dioxide gas is reacted with additional copper-containing sulfide ore to form elemental sulfur, an iron oxide and a copper sulfide.

Statement 5: A method according to any one of Statements 1-4, wherein drying the separated solids takes place at a temperature ranging from about 400° C. to about 900° C.

Statement 6: A method according to any one of Statements 1-5, wherein recovering copper from the solubilized copper sulfate is performed by a solvent extraction and electro-winning (SX-EW) process.

Statement 7: A method of recovering copper from sulfide ores having copper and iron, the method comprising reacting, in a reaction vessel, copper-containing sulfide ore with sulfuric acid and oxygen gas; separating solids formed during the reaction from liquids formed during the reaction; washing the solids with water to yield a solution comprising water and dissolved solids, and a solid portion undissolved copper-containing sulfide ore; and subjecting the solution comprising water and dissolved solids to a solvent extraction and electro-winning (SX-EW) process to isolate copper and iron.

Statement 8: A method according Statement 7, wherein the solids formed by reacting the copper-containing sulfide ore with sulfuric acid and oxygen gas comprise copper sulfate and iron sulfate.

Statement 9: A method according to Statement 7 or Statement 8, wherein the liquids formed by reacting the copper-containing sulfide ore with sulfuric acid and oxygen gas comprise sulfuric acid.

Statement 10: A method according to Statement 9, wherein the formed sulfuric acid is recycled and reacted with additional copper-containing sulfide ore and oxygen gas.

Statement 11: A method according to any one of Statements 7-10, wherein the solid portion comprises undissolved copper-containing sulfide ore and one or more materials comprising of elemental sulfur, pyrite, silica, and precious metals.

Statement 12: A method according to Statement 11, further comprising subjecting the solid portion to a flotation process to separate the undissolved copper-containing sulfide ore from the one or more materials.

Statement 13: A method according to Statement 12, wherein the undissolved copper-containing sulfide ore is reacted with sulfuric acid and oxygen gas.

Statement 14: A method according to Statement 12 or Statement 13, further comprising subjecting the one or more materials to a flotation process to yield one or more of isolated elemental sulfur, isolated pyrite and a mixture of remaining materials.

Statement 15: A method according to Statement 14, further comprising subjecting the remaining materials to a leaching process to yield isolated precious metals.

Statement 16: A method according to any one of Statements 7-14, wherein the purified iron is obtained via a precipitation process.

Statement 17: A method according to Statement 16, wherein water formed during the precipitation process is recycled and reintroduced into the solvent extraction and electro-winning (SX-EW) process.

Statement 18: A method according to any one Statements 7-17, wherein water produced during the solvent extraction and electro-winning (SX-EW) process is recycled and subsequently used to wash the separated solids.

Statement 19: A method according to any one of Statements 7-18, wherein reacting the copper-containing sulfide ore with sulfuric acid and oxygen gas is performed at a temperature ranging from about 100° C. to about 200° C.

Statement 20: A method according to any one of Statements 7-19, wherein reacting the copper-containing sulfide ore with sulfuric acid and oxygen gas is performed over a period of time ranging from about 30 minutes to about 2 hours.

Statement 21: A method according to any one of Statements 7-20, wherein the oxygen gas is injected into the reaction vessel at a rate ranging from about 1 L/min to about 4 L/min.

Statement 22: A method according to any one of Statements 7-21, wherein reacting the copper-containing sulfide ore with sulfuric acid and oxygen gas is performed with stirring at a stir rate ranging from about 200 rpm to about 550 rpm.

EXAMPLES

The following examples are intended to be illustrative only, and are not intended to be, nor should they be construed as, limiting in any way of the scope of the present disclosure.

General Experimental Conditions

A copper concentrate sample was obtained from Cananea Concentrator. The concentrate was characterized using atomic absorption spectroscopy to determine the elements in the sample. The sample was then subjected to metallurgical tests including agitated leaching. The copper concentrate sample included 237±4 g/t (grams/ton) Ag, 24.71±0.02% Cu, 20.87±0.25% Fe, 2.57±0.12% Zn, and 0.32±0.02% Mo.

The experimental setup included a 2-liter glass vessel equipped with a heater, a reaction stirrer, and an oxygen diffuser system substantially as described in FIG. 2. The concentrate was mixed with sulfuric acid to form a slurry at 130° C. Pure oxygen was used to feed the reactor by a diffuser system.

The tests were carried out with a fully stirred reactor. Once the time of reaction had passed, the contents of the reactor were vacuum filtered to separate solids from the reaction solution for chemical analysis. The copper extraction percentage was calculated based on the results obtained.

The standard conditions for the leaching experiments were as follows: a stir rate of 550 rpm, a temperature of 130° C., an $O_2$ flow rate of 2 liters/minute (L/min) and a pulp density of 20 w/w % in concentrated sulfuric acid (that is, an approximately 18 molar, or 18M, aqueous sulfuric acid solution).

Example 1

Figure 3:
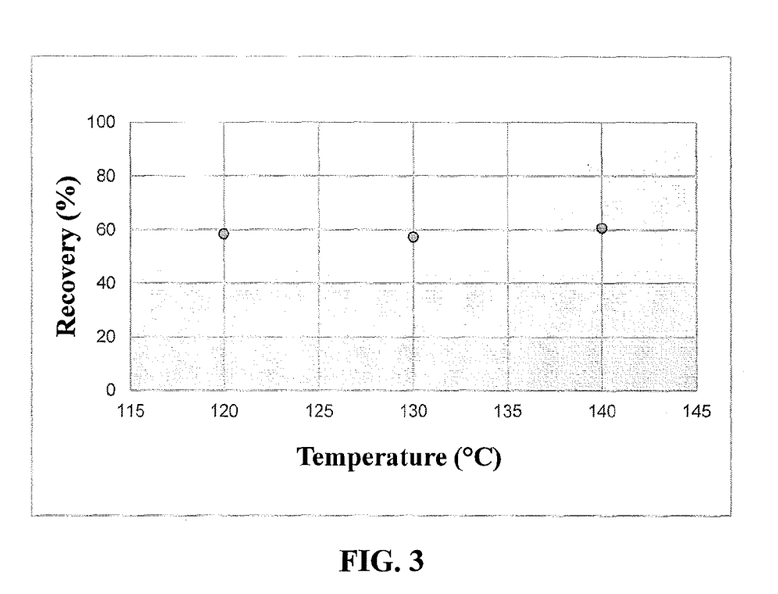
FIG. 3 is a graphical representation illustrating the effect of temperature in a method for the processing of copper-containing sulphide ores and isolation of individual elements of said ores in accordance with various embodiments of the present disclosure.

In the present example, the percent recovery of copper, using the above described general experimental conditions, was assessed under varying temperatures. Specifically, copper recovery was conducted at 120° C., 130° C. and 140° C. respectively. Each temperature assessed was conducted over a 90 minute period of time. Under all temperatures the percent recovery of copper from the concentrate sample was about 60%, indicating that the temperature used does not have a noticeable effect over the temperature range. FIG. 3 is a graphical representation illustrating the effect of temperature during processing of the copper-containing sulphide ore and isolation of copper of said ore in accordance with various embodiments of the present disclosure.

Example 2

Figure 4:
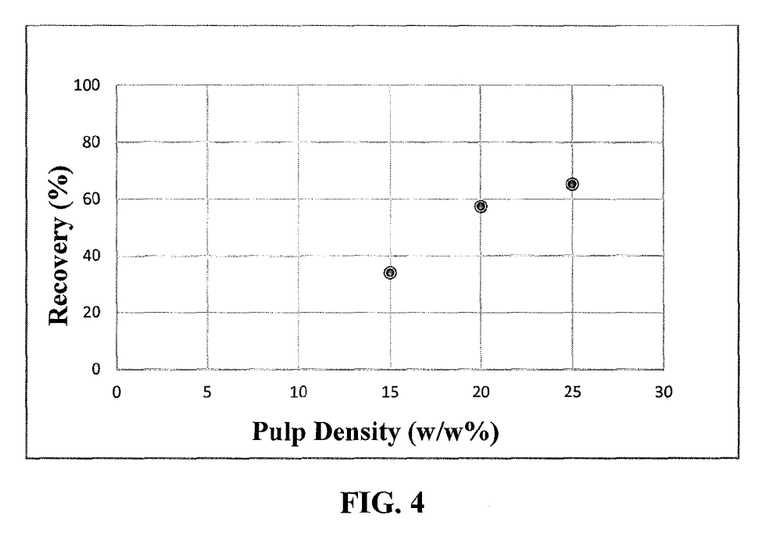
FIG. 4 is a graphical representation illustrating the effect of initial pulp density, or specific gravity, in a method for the processing of copper-containing sulphide ores and isolation of individual elements of said ores in accordance with various embodiments of the present disclosure.

In the present example, the percent recovery of copper, using the above described general experimental conditions, was assessed under varying pulp densities of concentrate sample. Specifically, copper recovery was evaluated over a 90 minute period of time using concentrate samples having pulp densities of 15 w/w %, 20 w/w %, and 25 w/w %, respectively. The percent recovery of copper from the concentrate sample was approximately 35% from the 15 w/w % sample, approximately 58% from the 20 w/w % sample, and approximately 65% from the 25 w/w %. The data of Example 2 therefore indicates that the efficiency of copper recovery increases with concentrate sample pulp density over the tested range. FIG. 4 is a graphical representation illustrating the effect of pulp density during processing of the copper-containing sulphide ore and isolation of copper of said ore in accordance with various embodiments of the present disclosure.

Example 3

Figure 5:
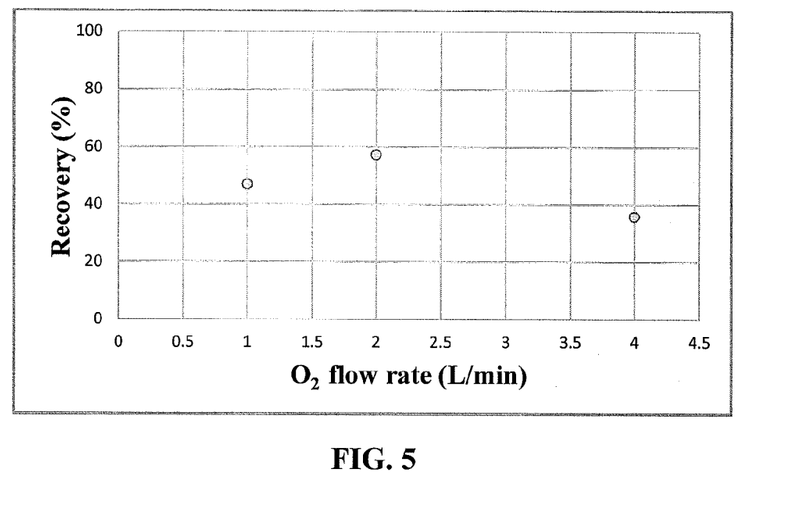
FIG. 5 is a graphical representation illustrating the effect of oxygen flow rate in a method for the processing of copper-containing sulphide ores and isolation of individual elements of said ores in accordance with various embodiments of the present disclosure.

In the present example, the percent recovery of copper, using the above described general experimental conditions, was assessed under varying oxygen (02) flow rates. Specifically copper recovery was conducted using 02 flow rates of 1 L/min, 2 L/min, and 4 L/min, respectively. Each flow rate assessed was conducted over a 90 minute period of time. The percent recovery of copper from the concentrate sample was approximately 47% using a 1 L/min $O_2$ flow rate, approximately 58% using a 2 L/min $O_2$ flow rate, and approximately 37% using a 4 L/min $O_2$ flow rate. The data of Example 3 therefore indicates that the efficiency of copper recovery is optimized between 1 and 4 L/min over the tested range. FIG. 5 is a graphical representation illustrating the effect of $O_2$ flow rate during processing of the copper-containing sulphide ore and isolation of copper of said ore in accordance with various embodiments of the present disclosure.

Example 4

Figure 6:
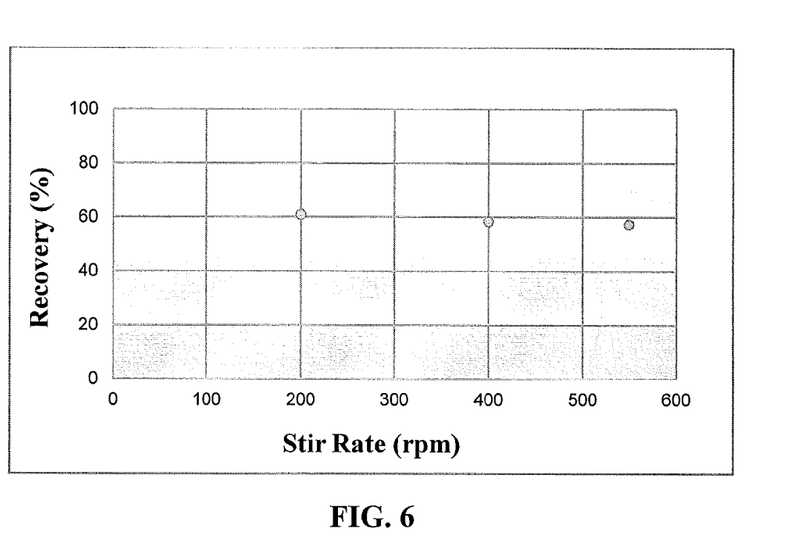
FIG. 6 is a graphical representation illustrating the effect of stir rate in a method for the processing of copper-containing sulphide ores and isolation of individual elements of said ores in accordance with various embodiments of the present disclosure.

In the present example, the percent recovery of copper, using the above described general experimental conditions, was assessed under varying stir rates. Specifically copper recovery was conducted using stir rates of 200 rpm, 400 rpm and 550 rpm, respectively. Each stir rate assessed was conducted over a 90 minute period of time. The percent recovery of copper from the concentrate sample was approximately 61% using a stir rate or 200 rpm, approximately 59% using a stir rate or 400 rpm, and approximately 58% using a stir rate or 550 rpm. The data of Example 4 therefore indicates that the efficiency of copper recovery is only marginally reduced with increasing stir rate over the tested range. FIG. 6 is a graphical representation illustrating the effect of stir rate during processing of the copper-containing sulphide ore and isolation of copper of said ore in accordance with various embodiments of the present disclosure.

Example 5

Figure 7:
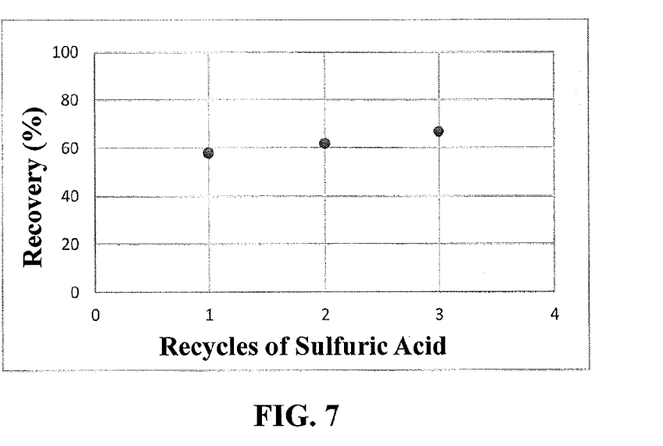
FIG. 7 is a graphical representation illustrating the effect of cycles of using recycled sulphuric acid in a method for the processing of copper-containing sulphide ores and isolation of individual elements of said ores in accordance with various embodiments of the present disclosure.

In the present example, the percent recovery of copper, using the above described general experimental conditions, was assessed under repeated cycles of using recycled sulphuric acid and an amount of new concentrated sulfuric acid equivalent to the concentrated sulphuric reacted in the previous cycle. Specifically copper recovery was conducted using 1 cycle, 2 cycles and 3 cycles of recycled concentrated sulphuric acid, respectively. Each number of cycles assessed was conducted over a 90 minute period of time. The percent recovery of copper from the concentrate sample was approximately 58% using 1 cycle of recycled sulphuric acid, approximately 62% using 2 cycles of recycled sulphuric acid, and approximately 67% using 3 cycles of recycled sulphuric acid. The data of Example 5 therefore indicates that the efficiency of copper recovery is increased as the number of cycles of recycled concentrated sulphuric acid is increased. FIG. 7 is a graphical representation illustrating the effect of cycles of using recycled concentrated sulphuric acid during processing of the copper-containing sulphide ore and isolation of copper of said ore in accordance with various embodiments of the present disclosure.

It will be apparent that various other modifications and adaptations of the embodiments or application will be apparent to the person skilled in the art after reading the foregoing disclosure without departing from the scope of the application and it is intended that all such modifications and adaptations come within the scope of the appended claims.

What is claimed is:

1. A method of recovering copper from sulfide ores having copper and iron, the method comprising:
   reacting, in a reaction vessel, copper-containing sulfide ore with sulfuric acid and oxygen gas;
   separating solids formed during the reaction from liquids formed during the reaction;
   washing the solids with water to yield a solution comprising water and dissolved solids, and a solid portion undissolved copper-containing sulfide ore;
   subjecting the solution comprising water and dissolved solids to a solvent extraction and electro-winning (SX-EW) process to isolate copper from the solution;
   isolating the copper from the solution to form a copper-deficient solution comprising iron and water;
   precipitating, using a precipitation process, the iron from the copper-deficient solution and separating the water from the precipitated iron; and
   introducing the separated water into the solvent extraction and electro-winning (SX-EW) process.

2. The method of claim 1, wherein the solids formed by reacting the copper-containing sulfide ore with sulfuric acid and oxygen gas comprise copper sulfate and iron sulfate.

3. The method of claim 1, wherein the liquids formed by reacting the copper-containing sulfide ore with sulfuric acid and oxygen gas comprise sulfuric acid.

4. The method of claim 3, wherein the formed sulfuric acid is recycled and reacted with additional copper-containing sulfide ore and oxygen gas.

5. The method of claim 1, wherein the solid portion comprises undissolved copper-containing sulfide ore and one or more materials comprising of elemental sulfur, pyrite, silica, and precious metals.

6. The method of claim 5, further comprising subjecting the solid portion to a flotation process to separate the undissolved copper-containing sulfide ore from the one or more materials.

7. The method of claim 6, wherein the undissolved copper-containing sulfide ore is reacted with sulfuric acid and oxygen gas.

8. The method of claim 6, further comprising subjecting the one or more materials to a flotation process to yield one or more of isolated elemental sulfur, isolated pyrite and a mixture of remaining materials.

9. The method of claim 8, further comprising subjecting the remaining materials to a leaching process to yield isolated precious metals.

10. The method of claim 1, wherein water produced during the solvent extraction and electro-winning (SX-EW) process is recycled and used to wash the separated solids.

11. The method of claim 1, wherein reacting the copper-containing sulfide ore with sulfuric acid and oxygen gas is performed at a temperature ranging from about 100° C. to about 200° C.

12. The method of claim 1, wherein reacting the copper-containing sulfide ore with sulfuric acid and oxygen gas is performed over a period of time ranging from about 30 minutes to about 2 hours.

13. The method of claim 1, wherein the oxygen gas is injected into the reaction vessel at a rate ranging from about 1 L/min to about 4 L/min.

14. The method of claim 1, wherein reacting the copper-containing sulfide ore with sulfuric acid and oxygen gas is performed with stirring at a stir rate ranging from about 200 rpm to about 550 rpm.

* * * * *